United States Patent [19]
Jelesko

[11] 3,957,032
[45] May 18, 1976

[54] PIPE BENDING APPARATUS

[76] Inventor: Anton F. E. Jelesko, P.O. Box 152, Georgetown, Calif. 95634

[22] Filed: Mar. 13, 1972

[21] Appl. No.: 234,054

[52] U.S. Cl. .................... 126/271.2 R; 126/349; 126/351; 126/374; 425/392; 432/211; 432/225
[51] Int. Cl.² .......................................... F23C 5/00
[58] Field of Search ............... 126/229, 265, 271.1, 126/271.2 R, 349, 350 R, 351, 374, 226, 240, 345; 263/2, 4, 5; 264/285, 230, 345; 425/392; 432/197, 210, 211, 184, 225

[56] References Cited
UNITED STATES PATENTS

| | | | |
|---|---|---|---|
| 829,471 | 8/1906 | Harvey | 432/211 |
| 1,722,077 | 7/1929 | Dary | 126/350 R |
| 2,303,702 | 12/1942 | Mantz | 126/351 X |
| 2,626,754 | 1/1953 | Parker et al. | 126/351 X |
| 2,815,888 | 12/1957 | Faucher | 126/349 UX |
| 3,466,020 | 9/1969 | Blinne | 263/4 |

*Primary Examiner*—Kenneth W. Sprague
*Assistant Examiner*—James C. Yeung
*Attorney, Agent, or Firm*—Leslie M. Hansen

[57] ABSTRACT

The disclosed embodiment of the present invention is an apparatus for bending plastic pipe so that it can be molded to a desired configuration. The disclosed apparatus includes a generally cylindrical container which is open at one end and contains a heat transfer medium, preferably in liquid form, in which the plastic pipe can be submerged. The container is mounted at an acute angle with respect to horizontal so that one end of a pipe can be inserted into the open end thereof. A heating unit maintains the heat transfer medium within the container at a regulated temperature which is within the temperature range for heating plastic pipe sufficiently to permit it to be molded. The container and heating unit are mounted on a carriage for providing portability to the apparatus.

9 Claims, 3 Drawing Figures

U.S. Patent May 18, 1976 3,957,032
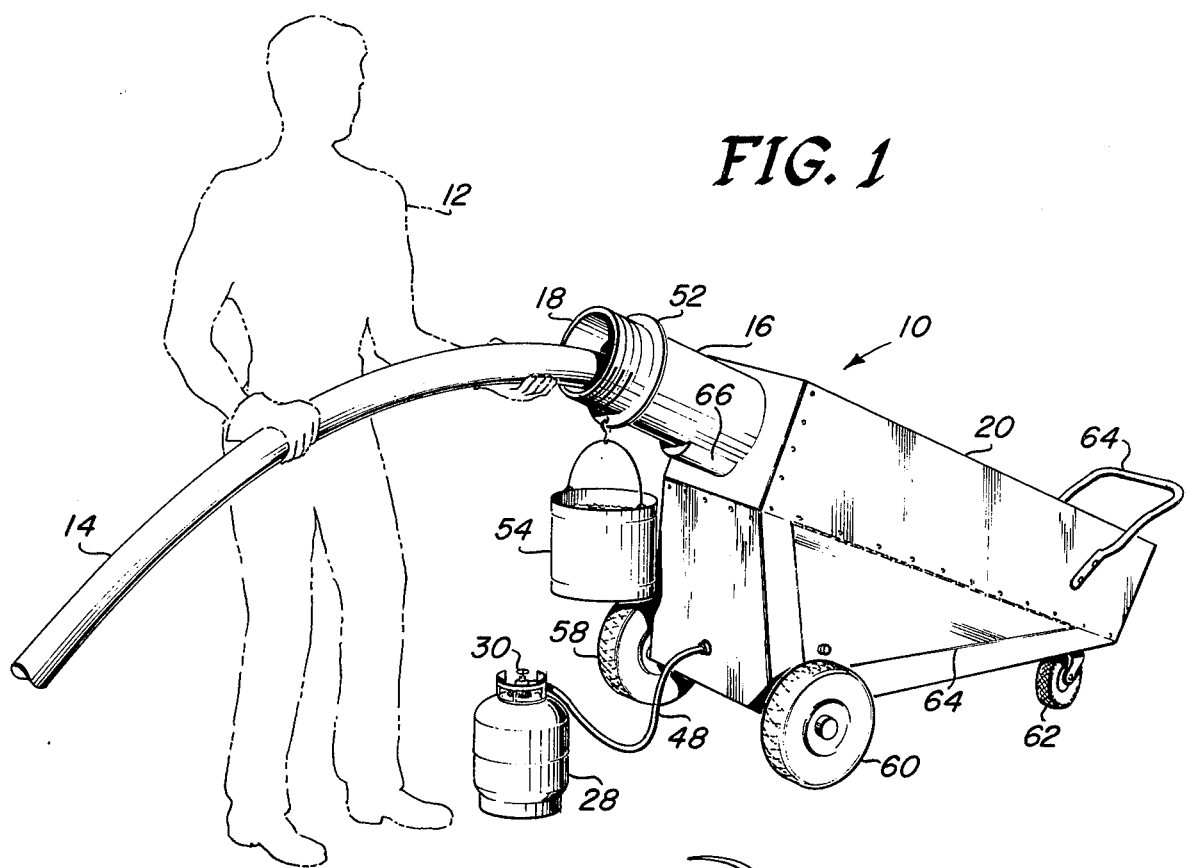
FIG. 1
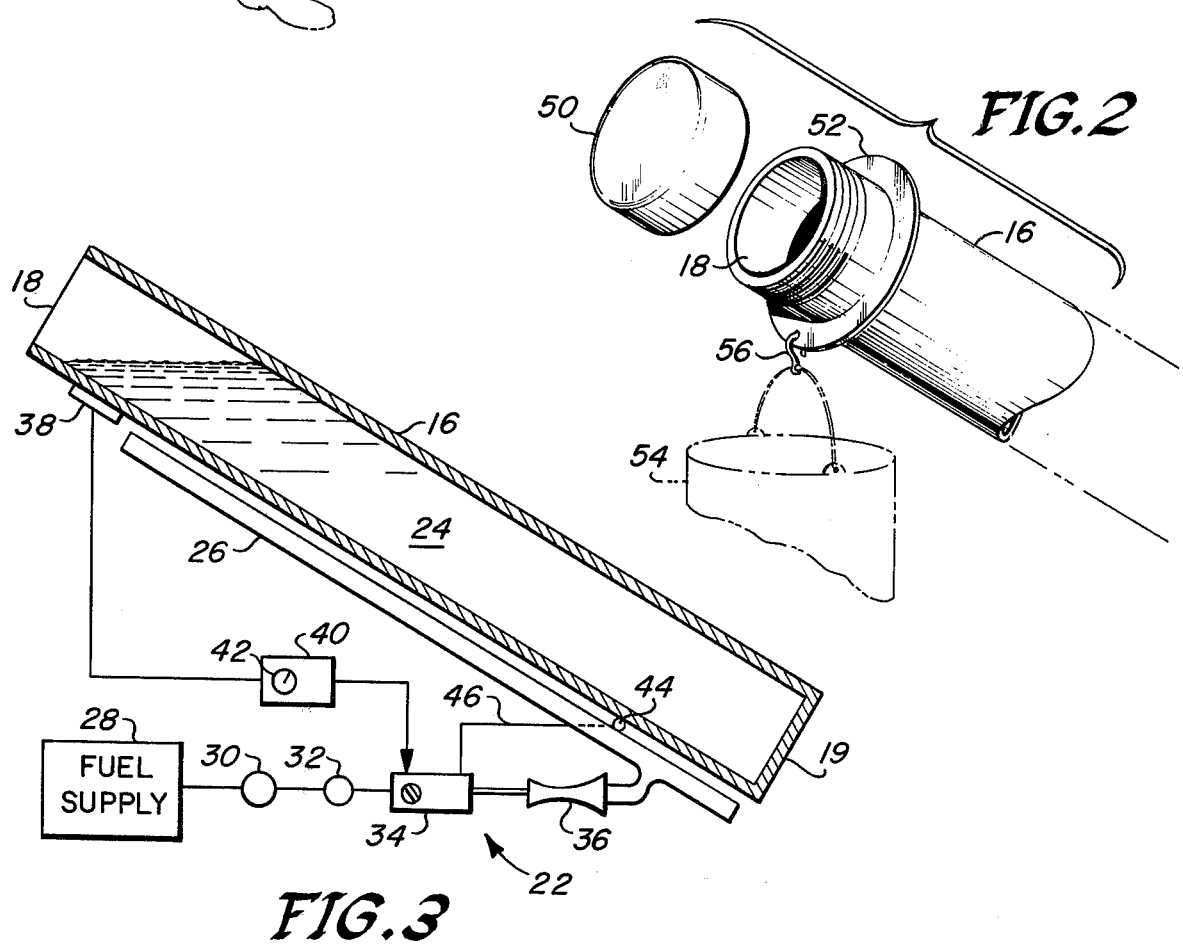
FIG. 2
FIG. 3

PIPE BENDING APPARATUS

FIELD OF THE INVENTION

This invention relates generally to an apparatus for heating plastic pipe to a temperature to permit it to be moled to a desired configuration, and more particularly to such an apparatus which employs a heat transfer liquid which can be easily transportable from one site to another in the field.

BACKGROUND OF THE INVENTION

Plastic pipe, particularly polyvinylchloride (PVC) pipe, has become widely accepted in many applications in place of or as a substitute for metallic pipe. In the installation of a plastic pipe, it may be desirable to change its configuration. For example, it may be necessary to bend the pipe to permit it to be passed over or around an obstruction. In many instances, particularly in the installation of pipe underground, the presence of such obstructions may not be known in advance. When such an obstruction is discovered, such as during the digging of a trench, it is desirable to have some means available for bending the pipe at the installation site to permit it to pass around the obstruction.

Accordingly, a need exists for apparatus which can be used at an installation site and moved from one site to another for bending plastic pipe. A number of techniques have been employed in the past for heating plastic pipe at the installation site to permit it to be molded to a desired configuration. However, such techniques have been only partially successful and generally have one or more disadvantages.

One such technique employs an electric blanket or pad which can be wrapped around the exterior of the plastic pipe to raise the temperature of that portion of the pipe sufficiently to permit it to be molded. Of course, such a heating element requires a source of electrical power which is generally not available at an installation site. In addition, the heat transfer time is generally long and only a small portion of the pipe can be heated at any one time. Accordingly, the use of an electric blanket or pad for heating a plastic pipe, if electrical power is available, is generally slow and time consuming. Another technique which has been employed is that of raising the temperature of the plastic material by the direct application of a flame to the external surface of the pipe. This process, of course, can only heat a relatively small surface area of the pipe at any given time and is, therefore, a relatively slow and tedious process. Furthermore, the direct application of a flame, such as by the use of a blow torch, to the external surface of a plastic pipe, tends to burn the outer layer of material, thereby reducing its strength and other qualities.

Both of the above mentioned techniques for heating a plastic pipe suffer from the disadvantage of not having a medium which retains heat from the heat source and which can be employed for transferring heat to the plastic pipe. That is, each of the above techniques has no means for storing heat and transferring that stored heat to the pipe. Accordingly, these techniques are generally slow and time consuming and, therefore, undesirable.

Another technique employs an electric quartz heater in which the quartz is used as a heat source for retaining and transferring heat to the plastic pipe. Although the electric quartz heater does not suffer from the disadvantage mentioned in connection with the other techniques, all of the mentioned techniques apply heat only to the external surface of the pipe. When heat is applied to only an external surface of the pipe, its moldability is reduced. The electric quartz heater also suffers from the disadvantage of requiring a source of electrical power at the installation site.

Accordingly, it can be readily appreciated that a need exists for apparatus for heating plastic pipe to permit it to be molded to any desired configuration, which is portable, requires no electrical power, provides heat to both the external and internal surfaces of the pipe, heats the pipe at a relatively fast rate, and does not damage the pipe or reduce its strength and other characteristics.

SUMMARY OF THE INVENTION

Accordingly, it is an object of the present invention to provide an apparatus for heating a plastic pipe which can be employed at an installation site and is portable.

Still another object of the present invention is to provide an apparatus for heating plastic pipe which includes a self-contained heat source.

A further object of the present invention is to provide an apparatus for heating plastic pipe which includes a heat storage and transfer medium, thereby increasing the rate at which the temperature of the plastic pipe is raised.

Still a further object of the present invention is to provide an apparatus for heating plastic pipe which does not damage the surface of the pipe or reduce its strength or other characteristics.

These and other objects are attained by the present invention which generally includes a container for a heat exchange medium into which the plastic pipe can be submerged, a heating unit for supplying regulated heat to the container, and a carriage for supporting the container and heating unit, which carriage is mobil for portability of the apparatus.

A feature of the present invention resies in the use of a tube having one open end and forming the container for the heat exchange medium. A further feature of the present invention resides in the mounting of the tube at an acute angle with respect to horizontal such that the open end thereof is easily accessible for inserting and submerging a pipe into the liquid heat exchange medium contained therein.

The present invention has the distinct advantage of being portable and, therefore, readily movable from one installation site to another without the loss of any of the heat exchange liquid and without the danger of spillage. Furthermore, the present invention has the advantage of being self-contained and requires no external source of power. A further advantage resides in the relatively fast transfer of heat to the plastic pipe to permit it to be molded.

BRIEF DESCRIPTION OF FIGURES

These and other objects, features, and advantages of the present invention will be more fully realized and understood from the following detailed description, when taken in conjunction with the accompanying drawing, wherein:

FIG. 1 is a view in perspective of an apparatus for heating plastic pipe and constructed in accordance with the principles of the present invention;

FIG. 2 is a detailed and exploded view, partially broken away, of the open end of the container and a cap therefor; and FIG. 3 is a diagrammatic view, partially in section, of the container for the heat exchange medium and the heating unit therefor.

Like reference numerals throughout the various views of the drawing are intended to designate the same or similar elements.

DETAILED DESCRIPTION

With reference to the drawing in detail, and in particular to FIG. 1, there is shown an apparatus, generally designated with the reference number 10, which is constructed in accordance with the principles of the present invention for heating plastic pipe to a temperature to permit it to be molded to a desired curvature. FIG. 1 illustrates a man in phantom outline and designated with the reference numeral 12, holding a plastic pipe 14, such that its one end is inserted into the apparatus 10.

Generally, the apparatus 10 includes a container in the form of tube 16 for holding a heat transfer medium, such as glycerin, therein. The tube 16 is open at its one end 18 and is closed at its other end 19. The tube 16 is mounted in a housing generally designated with the reference numeral 20 which is supported on a carriage.

Mounted within the housing 20 is a heating unit, generally designated with the reference numeral 22, and illustrated in the diagrammatic view of FIG. 3. As shown more clearly in FIG. 3, the tube 16 contains a quantity of glycerin 24 into which the pipe 14 can be submerged. The heating unit 22 includes a gas burner 26 which forms a heating element and extends below and substantially along the entire length of the tube 16 for heating the glycerin 24 to a desired temperature. As is well known, the gas burner 26 is provided with a plurality of orifices, each of which supports a flame which impinges on the bottom surface of the tube 16, thereby supplying heat thereto.

The heating unit 22 includes a fuel supply 28 which, as shown in FIG. 1, may be formed of a pressurized tank containing propane gas. Gas from the fuel supply 28 is supplied through a shut-off valve 30, a low pressure gas regulator 32, and a gas controller 34 to a venturi 36. A thermostatic bulb 38 is mounted on the tube 16 adjacent its open end 18 for sensing the temperature of the glycerin 24 therein. The thermostatic bulb 38 is connected through a thermostat 40 to the gas controller 34. The thermostat 40 is provided with a temperature control knob 42 for setting the temperature to which the glycerin 24 will be heated. A pilot generator 44 is mounted adjacent the burner 26 and receives a small supply of gas from the controller 34 as well as provides a signal to the controller 34 which indicates the existence of a pilot flame. Both the gas line and electrical control line are represented by a line designated with the reference numeral 46. Each of the elements included within and forming the heating unit 22 are well known elements, such as may be employed in a gas furnace. The venturi 36 supplies a regulated mixture of gas and air to the burner 26.

The heating unit 22 with the exception of the fuel supply 28 and the shut-off valve 30 are mounted within the housing 20. Fuel is supplied from the fuel supply 28 to the interior of the housing 20 by means of a hose 48.

An important feature of the present invention resides in the use of the tube 16 as a container for the glycerin 24 which is open only at its one end 18. This feature, in combination with the mounting of the tube 16 at an acute angle with respect to horizontal, provides a number of distinct advantages not realized by any of the prior known methods for heating plastic pipe in the field. The relatively small opening for inserting the pipe, although sufficient to receive the pipe 14 therein, permits ease of handling and transporting of the glycerin from one installation site to another. In particular, the relatively small opening can be easily closed by means of a cap or cover 50, as shown in FIG. 2, which, in the preferred embodiment of the present invention, is threadily engageable with the open end 18 of the tube 16. As shown in FIGS. 1 and 2, a drip shield 52 in the form of a flange is mounted on the tube 16 adjacent its open end 18. When the pipe 14 is being withdrawn from the tube 16, liquid glycerin which adheres its surface may run over the edge of the tube 16 and down its inclined outer surface. The drip shield 52 prevents the glycerin from running down the entire length of the tube 16, but rather causes it to drip into a bucket 54 attached by means of a hook 56 thereto.

As shown in FIG. 1, the carriage which supports the housing 20 is mounted on a plurality of wheels 58, 60, and 62 for providing mobility to the apparatus 10. In addition, a handle 64 is secured to the housing 20 so that it can be moved from one installation site to the other. If desired, the wheel 62 may be replaced by a skid. The housing 20 is provided with an access door 64 which permits access to the heating unit 22. The thermostatic bulb 38 is mounted on an external surface of the tube 16 within a housing 66.

As shown more clearly in FIG. 1, the inclination of the tube 16 at an acute angle with respect to horizontal facilitates the insertion and withdrawal of the pipe 14 into the glycerin 24 contained within the tube 16. The tube 16 is preferably of a sufficient length to permit at least one-half of a section of pipe, such as the pipe 14, to be submerged within the glycerin 24. Accordingly, one-half of the pipe 14 can be heated, molded, and then cooled and then the other half can be similarly treated to provide the pipe 14 with any desired curvature.

The present invention may be employed to bend any type of plastic pipe, such as a polyvinylchloride pipe. Different materials of pipes may, however, require a different temperature setting, which is accomplished by setting the thermostat 40. It can also be appreciated that different types of heat exchange mediums may be employed, rather than the glycerin 24. However, glycerin, or more precisely glycerol, is a good wetting agent, has a high flash point, and has excellent heat transfer characteristics, thereby making it suitable as a heat transfer medium.

It can be readily appreciated that the present invention has many advantages not realized by many of the prior known techniques for heating plastic pipe to permit it to be moled to a desired curvature. For example, the particular heat exchange medium disclosed herein causes no damage to any part of the plastic pipe 14 and does not deteriorate or lower any of its qualities or characteristics. In addition, the apparatus 10 is extremely safe, since there is little liklihood of spillage of hot glycerin. The particular disclosed arrangement and heat exchange medium permit relatively fast transfer of heat to the pipe 14. In addition, the apparatus 19 requires no external source of power and is easily movable from one installation site to another. The use of liquid glycerin permits the application of heat to both the external and internal surfaces of the pipe, thereby heating the pipe 14 more uniformly and thoroughly. Furthermore, a relatively large portion of the pipe 14 can be heated at one time, as opposed to some of the prior art techniques which can only heat a relatively small area at any given time.

The invention claimed is:

1. Apparatus for heating plastic pipe to permit it to be molded to a desired curvature, comprising:
   a. an elongated container having an open end for receiving the plastic pipe therein,
   b. means for supporting said container at an acute angle with respect to horizontal,
   c. a fluid heat exchange medium contained in said container and disposed for directly contacting a pipe to be heated, and
   d. means for applying heat to said container.

2. An apparatus as defined in claim 1 wherein said supporting means includes a carriage and a pair of wheels mounted on said carriage.

3. An apparatus as defined in claim 1, wherein said container is formed of a tube having a closed end for supporting said heat exchange medium therein.

4. An apparatus as defined in claim 1, wherein said heat applying means includes a heating element extending along one side of said container.

5. An apparatus as defined in claim 1, wherein said heat exchange medium is glycerol.

6. An apparatus as defined in claim 1, wherein said heat applying means includes a fuel supply, means for sensing the temperature of said heat exchange medium and controlling said fuel supply in response thereto, a burner connected to said fuel supply and extending along a lower surface of said container to supply heat thereto.

7. An apparatus as defined in claim 1, wherein said container is formed of a tube having a closed end for supporting said heat exchange medium therein, and said heat applying means includes a heating element extending along one side of said tube.

8. An apparatus as defined in claim 7, wherein said heat applying means includes a thermostatic bulb attached to a surface of said tube and a thermostat connected thereto and to said heating element for controlling the temperature of said heat exchange medium.

9. An apparatus as defined in claim 8, wherein said supporting means includes a carriage and a pair of wheels mounted on said carriage for providing portability to said apparatus.

* * * * *